US010945200B2

(12) United States Patent
Lin et al.

(10) Patent No.: US 10,945,200 B2
(45) Date of Patent: Mar. 9, 2021

(54) USER EQUIPMENT AND METHOD FOR HANDLING NETWORK FEATURE CAPABILITIES

(71) Applicant: MEDIATEK INC., Hsin-Chu (TW)

(72) Inventors: Zong-Syun Lin, Hsinchu (TW); Chien-Chun Huang-Fu, Hsinchu (TW)

(73) Assignee: MEDIATEK INC., Hsin-Chu (TW)

(*) Notice: Subject to any disclaimer, the term of this patent is extended or adjusted under 35 U.S.C. 154(b) by 0 days.

(21) Appl. No.: 16/408,818

(22) Filed: May 10, 2019

(65) Prior Publication Data

US 2019/0349850 A1 Nov. 14, 2019

Related U.S. Application Data

(60) Provisional application No. 62/670,110, filed on May 11, 2018.

(51) Int. Cl.
*H04W 48/18* (2009.01)
*H04W 8/02* (2009.01)

(52) U.S. Cl.
CPC ............. *H04W 48/18* (2013.01); *H04W 8/02* (2013.01)

(58) Field of Classification Search
CPC .............................. H04W 48/18; H04W 8/02
USPC ...................................................... 455/435.2
See application file for complete search history.

(56) References Cited

U.S. PATENT DOCUMENTS 8,971,239 B2 * 3/2015 Oba ...................... H04W 48/18
370/326

2012/0208487 A1 * 8/2012 Tiwari .................. H04W 12/10
455/404.1
2019/0021064 A1    7/2019 Ryu et al.
2019/0208562 A1 *  7/2019 Kim ...................... H04W 48/14
2019/0230585 A1 *  7/2019 Chun .................... H04W 48/17

FOREIGN PATENT DOCUMENTS

WO    2018/008944 A1    1/2018
WO    2018/038412 A1    3/2018

OTHER PUBLICATIONS

3GPP TS 24.501 V16.0.0 (Mar. 2019) (Year: 2019).*

(Continued)

*Primary Examiner* — William Nealon
(74) *Attorney, Agent, or Firm* — McClure, Qualey & Rodack, LLP

(57) ABSTRACT

A method for handling network feature capabilities is provided. The method includes a UE determining whether a first access network with a first access type and a second access network with a second access type are registered on the same PLMN; if the first access network and the second access network register on the same PLMN, the UE determines whether a first registration procedure over the first access network occurred earlier than the second registration procedure over the second access network. The first registration procedure corresponds to first setting values for a plurality of network feature capabilities and the second registration procedure corresponds to second setting values for the network feature capabilities. If the first registration procedure over the first access network occurred earlier than the second registration procedure over the second access network, the UE adopts the second setting values for the network feature capabilities.

20 Claims, 6 Drawing Sheets

(56) References Cited

OTHER PUBLICATIONS

3GPP TSG-CT Meeting #109 C1-181244 (Feb. 2018) (Year: 2018).*
3GPP TSG-CT Meeting #109 C1-181696 (Feb. 2018) (Year: 2018).*
"No LADN information via configuration update procedure C1-181244;" 3GPP TSG-CT WG1 Meeting #109; Feb.-Mar. 2018; pp. 1-8.
"No LADN information via configuration update procedure C1-181296;" 3GPP TSG-CT WG1 Meeting #109; Feb.-Mar. 2018; pp. 1-8.
3rd generations partnership project; Technical Specification Group Core Network and Terminals; Non-Access-Stratum (NAS) protocol for 5G System (5GS); Stage 3 (Release 15); May 2018; pp. 1-289.
"Clarifications to configuration update procedure;" 3GPP TSG-CT WG1 Meeting #110; Apr. 2018; pp. 1-6.

* cited by examiner

|   | Octet1 | Octet2 | Octet3 | Octet4 | Octet5 |
|---|---|---|---|---|---|
| 8 | MPSI | Length of 5GS network feature support contents | 0 Spare | 0 | Spare |
| 7 | TWKN 26 | | 0 Spare | 0 | |
| 6 | 5GS network feature support IEI | | EMF | 0 Spare | |
| 5 | | | | 0 Spare | |
| 4 | | | EMC | 0 Spare | |
| 3 | | | | 0 Spare | |
| 2 | | | IMS-VoPS-N3GPP | 0 Spare | 0 |
| 1 | | | IMS-VoPS-3GPP | EMCW | 0 |

FIG. 2

USER EQUIPMENT AND METHOD FOR HANDLING NETWORK FEATURE CAPABILITIES

CROSS REFERENCE TO RELATED APPLICATIONS

This application claims priority of U.S. Provisional Patent Application No. 62/670,110, filed on May 11, 2018, the entirety of which is incorporated by reference herein

BACKGROUND OF THE INVENTION

Field of the Invention

The invention generally relates to a wireless communication technology, and more particularly, to handle the network feature capabilities for different types of access networks.

Description of the Related Art

Fifth generation (5G) communication technology, e.g. New Radio (NR) version, will be a key component of modern access networks. It will address high traffic growth and increasing demand for high-bandwidth connectivity. It will also support massive numbers of connected devices and meet the real-time, high-reliability communication needs of mission-critical applications.

In the 5G NR communication technology, Non Access Stratum (NAS) signaling can be applied to the 3GPP access network and the non-3GPP access network. The non-3GPP access network can use Non-3GPP Inter Working Function (N3IWF) to process the NAS signaling. However, for different registration procedure over different types of access networks, the network feature capabilities may have conflict. For example, when the UE uses 3GPP access network to register to the service network, the network feature capabilities provided in this registration procedure may be different form the network feature capabilities provided in prior registration procedures over different access networks.

BRIEF SUMMARY OF THE INVENTION

A method and user equipment (UE) for handling network feature capabilities are provided to overcome the problems mentioned above.

An embodiment of the invention provides a method for handling network feature capabilities. The method for handling network feature capabilities comprises user equipment (UE) determining whether a first access network with a first access type and a second access network with a second access type are registered on the same public land mobile network (PLMN); if the first access network with the first access type and the second access network with the second access type are registered on the same PLMN, the UE determines whether a first registration procedure over the first access network occurred earlier than the second registration procedure over the second access network, wherein the first registration procedure corresponds to first setting values for a plurality of network feature capabilities and the second registration procedure corresponds to second setting values for the plurality of network feature capabilities; and if the first registration procedure over the first access network occurred earlier than the second registration procedure over the second access network, the UE adopts the second setting values for the plurality of network feature capabilities.

In some embodiments of the invention, the first access type is 3GPP access and the second access type is non-3GPP access, or the first access type is non-3GPP access and the second access type is 3GPP access.

In some embodiments of the invention, method for handling network feature capabilities further comprises the following: if the first registration procedure over the first access network does not occur earlier than the second registration procedure over the second access network, the UE adopts the first setting values for the plurality of network feature capabilities.

In some embodiments of the invention, method for handling network feature capabilities further comprises the UE obtaining a first information element from a service network when the UE registers to the service network over the first access network, wherein the first information element comprises the first setting values of the plurality of network feature capabilities; and the UE obtains a second information element from the network when the UE registers to the service network over the second access network, wherein the second information element comprises second setting values for the plurality of network feature capabilities.

In some embodiments of the invention, method for handling network feature capabilities further comprises the following: if the first access network with the first access type and the second access network with the second access type do not register on the same PLMN, the UE adopts the first setting values for the plurality of network feature capabilities when the UE registers to the service network over the first access network; and adopts the second setting values for the plurality of network feature capabilities when the UE registers to the service network over the second access network.

In some embodiments of the invention, method for handling network feature capabilities further comprises the following: if the first registration procedure over the first access network occurred earlier than the second registration procedure over the second access network, the UE ignores the network feature capabilities corresponding to the first access network in the second information element.

An embodiment of the invention provides a method for handling network feature capabilities. The method for handling network feature capabilities comprises user equipment (UE) determining whether a first access network with a first access type and a second access network with a second access type are registered on the same public land mobile network (PLMN); if the first access network with the first access type and the second access network with the second access type are registered on the same PLMN, for a first part of the network feature capabilities, the UE adopts first setting values of the network feature capabilities corresponding to the latest registration procedure over the first access network.

An embodiment of the invention provides user equipment (UE) for handling network feature capabilities. The UE comprises a processor. The processor determines whether a first access network with a first access type and a second access network with a second access type are registered on the same public land mobile network (PLMN). If the first access network with the first access type and the second access network with the second access type are registered on the same PLMN, for a first part of the network feature capabilities, the processor adopts first setting values of the network feature capabilities corresponding to the latest registration procedure over the first access network.

Other aspects and features of the invention will become apparent to those with ordinary skill in the art upon review of the following descriptions of specific embodiments of method and user equipment for handling network feature capabilities.

BRIEF DESCRIPTION OF THE DRAWINGS

The invention will become more fully understood by referring to the following detailed description with reference to the accompanying drawings, wherein:

FIG. 2 is a schematic diagram of an information element according to an embodiment of the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
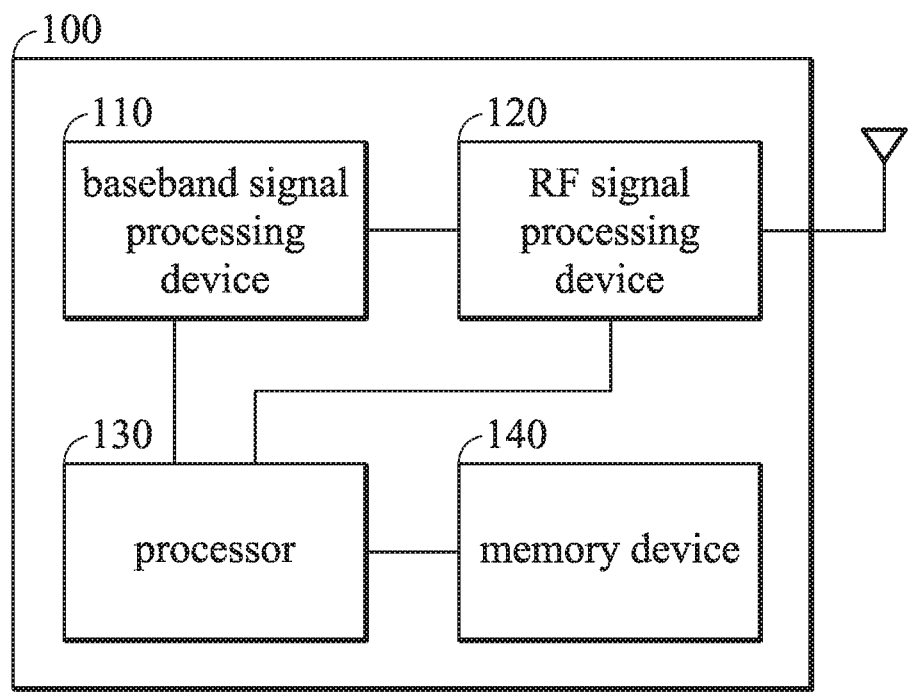
FIG. 1 is a block diagram of user equipment (UE) 100 for handling network feature capabilities according to an embodiment of the invention.

FIG. 1 is a block diagram of user equipment (UE) 100 for handling network feature capabilities according to an embodiment of the invention. As shown in FIG. 1, the UE 100 may comprise at least a baseband signal processing device 110, an RF signal processing device 120, a processor 130, a memory device 140, and an antenna module comprising at least one antenna. Note that, in order to clarify the concept of the invention, FIG. 1 presents a simplified block diagram in which only the elements relevant to the invention are shown. However, the invention should not be limited to what is shown in FIG. 1.

The RF signal processing device 120 may receive RF signals via the antenna and process the received RF signals to convert the received RF signals to baseband signals to be processed by the baseband signal processing device 110, or receive baseband signals from the baseband signal processing device 110 and convert the received baseband signals to RF signals to be transmitted to a peer communications apparatus. The RF signal processing device 120 may comprise a plurality of hardware elements to perform radio frequency conversion. For example, the RF signal processing device 120 may comprise a power amplifier, a mixer, analog-to-digital converter (ADC)/digital-to-analog converter (DAC), etc.

The baseband signal processing device 110 may further process the baseband signals to obtain information or data transmitted by the peer communications apparatus. The baseband signal processing device 110 may also comprise a plurality of hardware elements to perform baseband signal processing.

The processor 130 may control the operations of the baseband signal processing device 110 and the RF signal processing device 120. According to an embodiment of the invention, the processor 130 may also be arranged to execute the program codes of the software module(s) of the corresponding baseband signal processing device 110 and/or the RF signal processing device 120. The program codes accompanied by specific data in a data structure may also be referred to as a processor logic unit or a stack instance when being executed. Therefore, the processor 130 may be regarded as being comprised of a plurality of processor logic units, each for executing one or more specific functions or tasks of the corresponding software module(s).

The memory device 140 may store the software and firmware program codes, system data, user data, etc. of the UE 100. The memory device 140 may be a volatile memory such as a Random Access Memory (RAM); a non-volatile memory such as a flash memory or Read-Only Memory (ROM); a hard disk; or any combination thereof.

According to an embodiment of the invention, the RF signal processing device 120 and the baseband signal processing device 110 may collectively be regarded as a radio module capable of communicating with a wireless network to provide wireless communications services in compliance with a predetermined Radio Access Technology (RAT). Note that, in some embodiments of the invention, the UE 100 may be extended further to comprise more than one antenna and/or more than one radio module, and the invention should not be limited to what is shown in FIG. 1.

In addition, in some embodiments of the invention, the processor 130 may be configured inside of the baseband signal processing device 110, or the UE 100 may comprise another processor configured inside of the baseband signal processing device 110. Thus the invention should not be limited to the architecture shown in FIG. 1.

According to an embodiment of the invention, when the UE 100 needs to register to a service network through the 5G New Radio (NR) communication technology, the UE 100 may use a 3GPP access network or a non-3GPP access network (e.g. Wi-Fi) to register to the service network. In the 5G NR communication technology, Non Access Stratum (NAS) signaling can be applied to the 3GPP access network and the non-3GPP access network. The non-3GPP access network can use Non-3GPP Inter Working Function (N3IWF) to process the NAS signaling.

In the embodiments of the invention, the UE 100 using the first access network with the first access type to register to the service network is regarded as a first registration procedure, and the UE 100 using the second access network with the second access type to register to the service network is regarded as a second registration procedure. The first registration procedure may correspond to the first setting values of a plurality of network feature capabilities and the second registration procedure may correspond to second setting values of the plurality of network feature capabilities. Specifically, when the UE 100 registers to the service network over the first access network, the RF signal processing device 120 of the UE 110 may obtain a first information element from a service network, and the first information element may comprise the first setting values of a plurality of network feature capabilities. In addition, when the UE 100 registers to the service network over the second access network, the RF signal processing device 120 of the UE 110 may obtain a second information element from the service network, and the second information element comprises the second setting values of a plurality of network feature capabilities. In the embodiments of the invention, the first setting values and the second setting values can be changed for different network environment (e.g. the location of the UE, but the invention should not be limited thereto).

FIG. 2 is a schematic diagram of an information element according to an embodiment of the invention. As shown in FIG. 2, the information element may comprise octet 1~octet 5 and a plurality of network feature capabilities, such as MPSI, IWKN26, EMF, EMC, IMS-VoPS-N3GPP, IMS-VoPS-3GPP, EMCW, and so on. Each octet may have 8 bits. The network feature capabilities IMS-VoPS-3GPP, EMF and EMC correspond to 3GPP access network. The network feature capability IMS-VoPS-3GPP is an IMS voice over PS session indicator for 3GPP access network. The network feature capability EMC is an emergency service support indicator for 3GPP access network. The network feature capability EMF is an emergency service fallback indicator for 3GPP access network. The network feature capabilities IMS-VoPS-N3GPP and EMCW correspond to non-3GPP network. The network feature capability IMS-VoPS-N3GPP is an IMS voice over PS session indicator for non-3GPP access network. The network feature capability EMCW is an emergency service support indicator for non-3GPP access network. In the first setting values and the second setting values, the setting values of the network feature capabilities may be different.

In an embodiment of the invention, when the UE 100 use the first access network with the first access type to register to the service network currently, the processor 130 of the UE 100 may determine whether the second access network with the second access type was used to register to the service network previously. In addition, on the other hand, when the UE 100 use the second access network with the second access type to register to the service network currently, the processor 130 of the UE 100 may also determine whether the first access network with the first access type was used to register to the service network previously. For example, when the UE 100 use the 3GPP access network to register to the service network currently, the processor 130 of the UE 100 may determine whether the non-3GPP access network was used to register to the service network previously. In addition, when the UE 100 use the non-3GPP access network to register to the service network currently, the processor 130 of the UE 100 may determine whether the 3GPP access network was used to register to the service network previously.

If the second access network with the second access type was not used to register to the service network previously (i.e. the UE 100 has only used the first access network with the first access type), the UE 100 may adopt the first setting values for the plurality of network feature capabilities to register to the service network. If the UE 100 has only used the 3GPP access network, the UE 100 may adopt the setting values corresponding to the 3GPP access network to register to the service network.

If the second access network with the second access type was used to register to the service network previously, the processor 130 may determine whether the first access network with the first access type and the second access network with the second access type are registered on the same public land mobile network (PLMN). If the first access network with the first access type and the second access network with the second access type are registered on the same PLMN, the processor 130 may determine whether the first registration procedure over the first access network occurred earlier than the second registration procedure over the second access network. In the embodiment of the invention, the second registration procedure over the second access network occurred earlier than the first registration procedure over the first access network, therefore, the processor 130 may adopt the first setting values for the plurality of network feature capabilities. For example, when the processor 130 determines that the 3GPP access network and the non-3GPP access network register on the same PLMN, the processor 130 may determine whether the registration procedure over the non-3GPP access network occurred earlier than the registration procedure over the 3GPP access network. If the registration procedure over the non-3GPP access network occurred earlier than the registration procedure over the 3GPP access network, the processor 130 may adopt the setting values (for the plurality of network feature capabilities) corresponding to the registration procedure over the 3GPP access network.

In an embodiment of the invention, if the second registration procedure over the second access network occurred earlier than the first registration procedure over the first access network, the processor 130 may ignore the network feature capabilities corresponding to the second access network in the first information element. As illustrated in FIG. 2, for example, if the registration procedure over the non-3GPP access network occurred earlier than the registration procedure over the 3GPP access network, the processor 130 may ignore the network feature capabilities corresponding to the non-3GPP access network in the information element (e.g. the bit 2 of the octet 3 and the bit 1 of the octet 4 in the information element will be ignored). In addition, if the registration procedure over the 3GPP access network occurred earlier than the registration procedure over the non-3GPP access network, the processor 130 may ignore the network feature capabilities corresponding to the 3GPP access network in the information element (e.g. the bit 1 and bits 3-6 of the octet 3 in the information element will be ignored).

In another embodiment of the invention, if the first access network with the first access type and the second access network with the second access type are registered on the same PLMN, for the first part of network feature capabilities (e.g. the network feature capabilities IMS-VoPS-3GPP, EMF and EMC), the processor 130 may adopt the setting values corresponding to the latest registration procedure over the first access network (e.g. 3GPP access network). Furthermore, in the embodiment of the invention, if the first access network with the first access type and the second access network with the second access type are registered on the same PLMN, for the second part of network feature capabilities (e.g. the network feature capability EMCW), the processor 130 may adopt the setting value corresponding to the latest registration procedure over the second access network (e.g. non-3GPP access network). In addition, in the embodiment of the invention, if the first access network with the first access type and the second access network with the second access type are registered on the same PLMN, for the third part of network feature capabilities (i.e. except for the first part of network feature capabilities and the second part of network feature capabilities, e.g. the network feature capabilities IMS-VoPS-3GPP, EMF, EMC and EMCW), the processor 130 may determine whether the first registration procedure over the first access network occurred earlier than the second registration procedure over the second access network (the following operations as the above embodiments and no more details are addressed herein).

If the first access network with the first access type and the second access network with the second access type do not register on the same PLMN, the processor 130 may adopt the first setting values for the plurality of network feature capabilities when the UE 100 registers to the service network over the first access network, and adopt the second setting values for the plurality of network feature capabilities when the UE 100 registers to the service network over the second access network.

Figure 3:
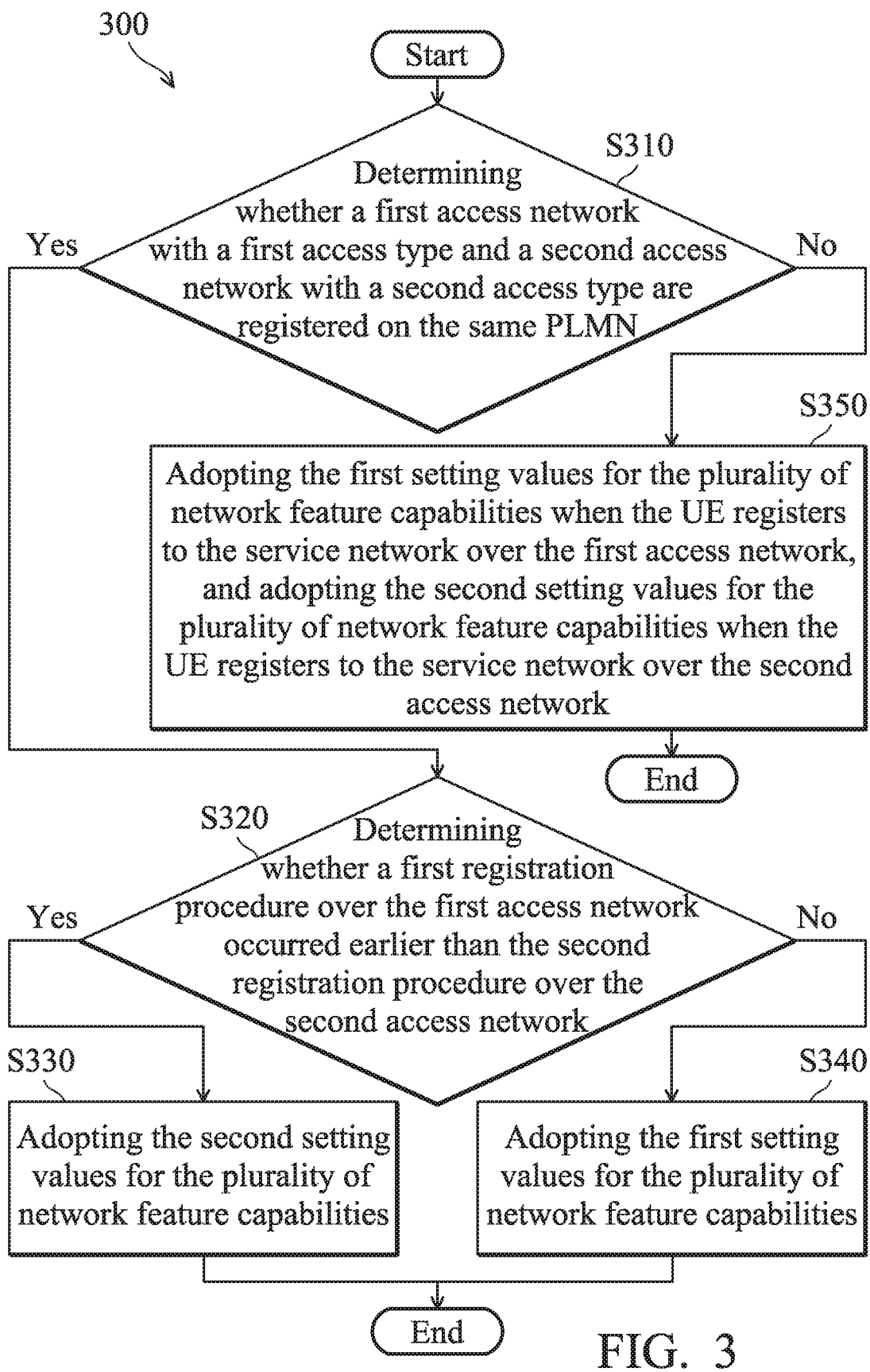
FIG. 3 is a flow chart 300 illustrating a method for handling network feature capabilities according to an embodiment of the invention.

FIG. 3 is a flow chart 300 illustrating a method for handling network feature capabilities according to an embodiment of the invention. The method for handling network feature capabilities can be applied to the UE 100. As shown in FIG. 3, in step S310, the UE 100 may determines whether a first access network with a first access type and a second access network with a second access type are registered on the same public land mobile network (PLMN). If the first access network with the first access type and the second access network with the second access type are registered on the same PLMN, step S320 is performed. In step S320, the UE 100 determines whether a first registration procedure over the first access network occurred earlier than the second registration procedure over the second access network, wherein the first registration procedure corresponds to first setting values for a plurality of network feature capabilities and the second registration procedure corresponds to second setting values for the plurality of network feature capabilities. If the first registration procedure over the first access network occurred earlier than the second registration procedure over the second access network, step S330 is performed. In step S330, the UE 100 adopts the second setting values for the plurality of network feature capabilities. If the first registration procedure over the first access network does not occur earlier than the second registration procedure over the second access network, step S340 is performed. In step S340, the UE 100 adopts the first setting values for the plurality of network feature capabilities.

If the first access network with the first access type and the second access network with the second access type are not registered on the same PLMN, step S350 is performed. In step S350, the UE 100 adopts the first setting values for the plurality of network feature capabilities when the UE registers to the service network over the first access network, and adopts the second setting values for the plurality of network feature capabilities when the UE registers to the service network over the second access network.

In an embodiment of the invention, for the flow chart 300, in the method for handling network feature capabilities, the first access type is 3GPP access and the second access type is non-3GPP access. In another embodiment of the invention, in the method for handling network feature capabilities, first access type is non-3GPP access and the second access type is 3GPP access.

In an embodiment of the invention, for the flow chart 300, the method for handling network feature capabilities further comprises the UE 100 obtaining a first information element from a service network when the UE registers to the service network over the first access network, wherein the first information element comprises the first setting values of the plurality of network feature capabilities, and the UE 100 obtains a second information element from the network when the UE registers to the service network over the second access network, wherein the second information element comprises second setting values for the plurality of network feature capabilities.

In an embodiment of the invention, the method for handling network feature capabilities further comprises the following: if the first registration procedure over the first access network occurred earlier than the second registration procedure over the second access network, the UE 100 may ignore the network feature capabilities corresponding to the first access network in the second information element.

Figure 4A:
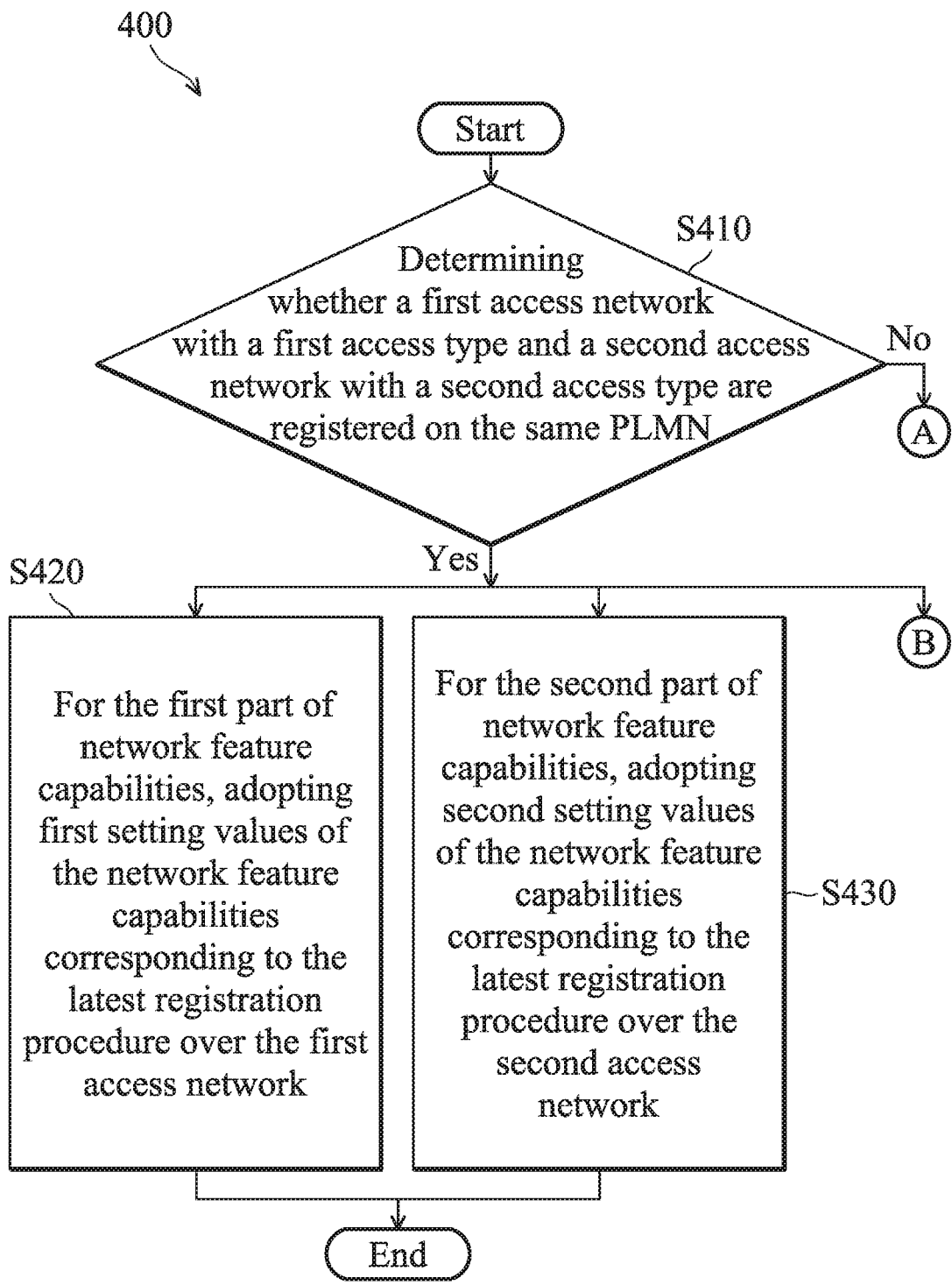
FIG. 4A-FIG. 4C is a flow chart 400 illustrating a method for handling network feature capabilities according to another embodiment of the invention.
Figure 4B:
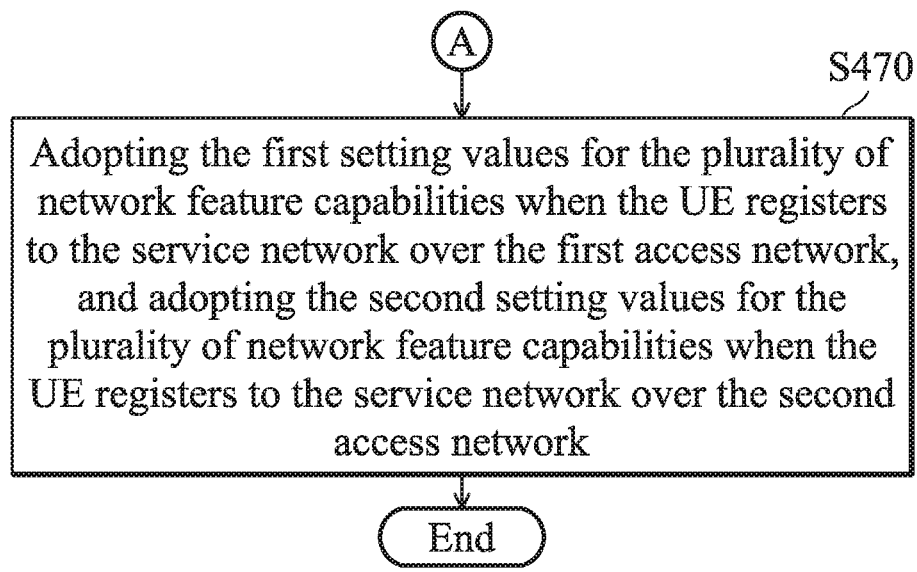
Figure 4C:
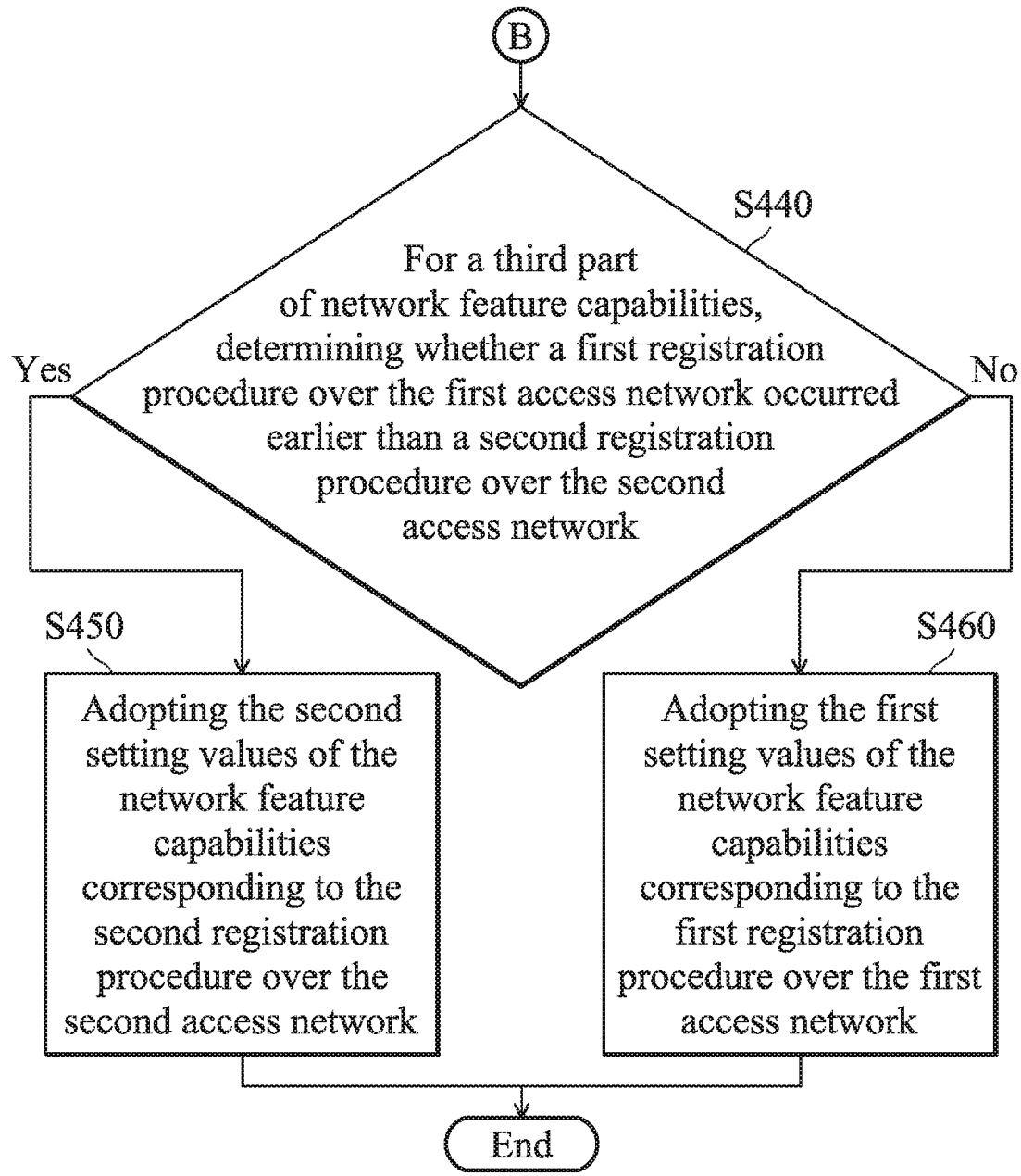

FIG. 4A-FIG. 4C is a flow chart 400 illustrating a method for handling network feature capabilities according to another embodiment of the invention. The method for handling network feature capabilities can be applied to the UE 100. As shown in FIG. 4A-FIG. 4C, in step S410, the UE 100 may determines whether a first access network with a first access type and a second access network with a second access type are registered on the same public land mobile network (PLMN). If the first access network with the first access type and the second access network with the second access type are registered on the same PLMN, for different parts of the network feature capabilities, step S420, S430 or S440 is performed. In step S420, for the first part of network feature capabilities, the UE 100 may adopt first setting values of the network feature capabilities corresponding to the latest registration procedure over the first access network. In step S430, for the second part of network feature capabilities, the UE 100 may adopt second setting values of the network feature capabilities corresponding to the latest registration procedure over the second access network. In an embodiment of the invention, the first access type is 3GPP access and the first part of the network feature capabilities includes IMS-VoPS-3GPP, EMF and EMC. In an embodiment of the invention, the second access type is non-3GPP access and the second part of the network feature capabilities includes EMCW.

In step S440, for a third part of network feature capabilities (i.e. except for the first part and the second part of the network feature capabilities), the UE 100 determines whether a first registration procedure over the first access network occurred earlier than a second registration procedure over the second access network. If the first registration procedure over the first access network occurred earlier than the second registration procedure over the second access network, step S450 is performed. In step S450, the UE 100 adopts the second setting values of the network feature capabilities corresponding to the second registration procedure over the second access network. If the first registration procedure over the first access network does not occur earlier than the second registration procedure over the second access network, step S460 is performed. In step S460, the UE 100 adopts the first setting values of the network feature capabilities corresponding to the first registration procedure over the first access network. In an embodiment of the invention, the third part of the network feature capabilities includes IMS-VoPS-N3GPP, IWKN26 and MPSI.

If the first access network with the first access type and the second access network with the second access type are not registered on the same PLMN, step S470 is performed. In step S470, the UE 100 adopts the first setting values for the plurality of network feature capabilities when the UE registers to the service network over the first access network, and adopts the second setting values for the plurality of network feature capabilities when the UE registers to the service network over the second access network.

In an embodiment of the invention, for the flow chart 400, in the method for handling network feature capabilities, the first access type is 3GPP access and the second access type is non-3GPP access. In another embodiment of the invention, in the method for handling network feature capabilities, first access type is non-3GPP access and the second access type is 3GPP access.

In an embodiment of the invention, for the flow chart 400, the method for handling network feature capabilities further comprises the UE 100 obtaining a first information element from a service network when the UE registers to the service network over the first access network, wherein the first information element comprises the first setting values of the plurality of network feature capabilities, and the UE 100 obtains a second information element from the network when the UE registers to the service network over the second access network, wherein the second information element comprises second setting values for the plurality of network feature capabilities.

In the methods for handling network feature capabilities, the UE may adopt the later setting values for the plurality of network feature capabilities to register to the service network. Therefore, in the method for handling network feature capabilities, for different registration procedure over different types of access networks, the conflict for the network feature capabilities will be reduced.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer software product may comprise packaging materials.

It should be noted that although not explicitly specified, one or more steps of the methods described herein can include a step for storing, displaying and/or outputting as required for a particular application. In other words, any data, records, fields, and/or intermediate results discussed in the methods can be stored, displayed, and/or output to another device as required for a particular application. While the foregoing is directed to embodiments of the present invention, other and further embodiments of the invention can be devised without departing from the basic scope thereof. Various embodiments presented herein, or portions thereof, can be combined to create further embodiments. The above description is of the best-contemplated mode of carrying out the invention. This description is made for the purpose of illustrating the general principles of the invention and should not be taken in a limiting sense. The scope of the invention is best determined by reference to the appended claims.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for handling network feature capabilities, comprising:
   determining, by an user equipment (UE), whether a first access network with a first access type and a second access network with a second access type are registered on the same public land mobile network (PLMN), wherein the UE uses the first access network with the first access type to register to a service network is regarded as a first registration procedure, and the UE uses the second access network with the second access type to register to the service network is regarded as a second registration procedure;
   if the first access network with the first access type and the second access network with the second access type are registered on the same PLMN, determining, by the UE, whether a first registration procedure over the first access network occurred earlier than a second registration procedure over the second access network, wherein in the first registration procedure, first setting values for a plurality of network feature capabilities are obtained by the UE and in the second registration procedure, second setting values for the plurality of network feature capabilities are obtained by the UE; and
   if the first registration procedure over the first access network occurred earlier than the second registration procedure over the second access network, adopting, by the UE, the second setting values for the plurality of network feature capabilities.

2. The method for handling network feature capabilities of claim 1, wherein the first access type is 3GPP access and the second access type is non-3GPP access or the first access type is non-3GPP access and the second access type is 3GPP access.

3. The method for handling network feature capabilities of claim 1, further comprising:
   if the first registration procedure over the first access network does not occur earlier than the second registration procedure over the second access network, adopting, by the UE, the first setting values for the plurality of network feature capabilities.

4. The method for handling network feature capabilities of claim 1, further comprising:
   obtaining, by the UE, a first information element from a service network when the UE registers to the service network over the first access network, wherein the first information element comprises the first setting values of the plurality of network feature capabilities; and
   obtaining, by the UE, a second information element from the network when the UE registers to the service network over the second access network, wherein the second information element comprises the second setting values for the plurality of network feature capabilities,
   wherein the method further comprising:
   if the first access network with the first access type and the second access network with the second access type do not register on the same PLMN, adopting, by the UE, the first setting values for the plurality of network feature capabilities when the UE registers to the service network over the first access network, and adopting, by the UE, the second setting values for the plurality of network feature capabilities when the UE registers to the service network over the second access network, and wherein the method further comprising:

if the first registration procedure over the first access network occurred earlier than the second registration procedure over the second access network, ignoring, by the UE, the network feature capabilities corresponding to the first access network in the second information element.

5. A method for handling network feature capabilities, comprising:

determining, by an user equipment (UE), whether a first access network with a first access type and a second access network with a second access type are registered on the same public land mobile network (PLMN);

if the first access network with the first access type and the second access network with the second access type are registered on the same PLMN, for a first part of the network feature capabilities, adopting, by the UE, first setting values of the network feature capabilities obtained in the latest registration procedure over the first access network to set the first part of the network feature capabilities, wherein the first part of the network feature capabilities corresponds to the first access network with the first access type.

6. The method for handling network feature capabilities of claim 5, wherein the first access type is 3GPP access and the first part of the network feature capabilities include IMS-VoPS-3GPP, EMF and EMC.

7. The method for handling network feature capabilities of claim 5, further comprising:

for a second part of the network feature capabilities, adopting, by the UE, second setting values of the network feature capabilities corresponding to the latest registration procedure over the second access network to set the second part of the network feature capabilities, wherein the second part of the network feature capabilities corresponds to the second access network with the second access type.

8. The method for handling network feature capabilities of claim 7, wherein the second access type is non-3GPP access and the second part of the network feature capabilities include EMCW.

9. The method for handling network feature capabilities of claim 7, further comprising:

if the first access network with the first access type and the second access network with the second access type are registered on the same PLMN for a third part of the network feature capabilities, determining, by the UE, whether a first registration procedure over the first access network occurred earlier than a second registration procedure over the second access network, wherein the first registration procedure corresponds to the first setting values for the network feature capabilities and the second registration procedure corresponds to second setting values for the network feature capabilities; and if the first registration procedure over the first access network occurred earlier than the second registration procedure over the second access network, adopting, by the UE, the second setting value the network feature capabilities corresponding to the second registration procedure over the second access network.

10. The method for handling network feature capabilities of claim 9, wherein the first access type is 3GPP access and the second access type is non-3GPP access or the first access type is non-3GPP access and the second access type is 3GPP access, and the third part of the network feature capabilities includes IMS-VoPS-N3GPP, IWKN26 and MPSI.

11. The method for handling network feature capabilities of claim 7, further comprising:

obtaining, by the UE, a first information element from a service network when the UE registers to the service network over the first access network, wherein the first information element comprises the first setting values of the network feature capabilities; and obtaining, by the UE, a second information element from the network when the UE registers to the service network over the second access network, wherein the second information element comprises the second setting values for the network feature capabilities.

12. The method for handling network feature capabilities of claim 11, further comprising:

if the first access network with the first access type and the second access network with the second access type do not register on the same PLMN, adopting, by the UE, the first setting values for the network feature capabilities when the UE registers to the service network over the first access network; and adopting, by the UE, the second setting values for the network feature capabilities when the UE registers to the service network over the second access network.

13. An user equipment (UE) for handling network feature capabilities, comprising:

a processor, determining whether a first access network with a first access type and a second access network with a second access type are registered on the same public land mobile network (PLMN), wherein if the first access network with the first access type and the second access network with the second access type are registered on the same PLMN, for a first part of the network feature capabilities, the processor adopts first setting values of the network feature capabilities obtained in the latest registration procedure over the first access network to set the first part of the network feature capabilities, wherein the first part of the network feature capabilities corresponds to the first access network with the first access type.

14. The UE for handling network feature capabilities of claim 13, wherein the first access type is 3GPP access and the first part of the network feature capabilities include IMS-VoPS-3GPP, EMF and EMC.

15. The UE for handling network feature capabilities of claim 13, wherein for a second part of the network feature capabilities, the processor adopts second setting values of the network feature capabilities corresponding to the latest registration procedure over the second access network to set the second part of the network feature capabilities, wherein the second part of the network feature capabilities corresponds to the second access network with the second access type.

16. The UE for handling network feature capabilities of claim 15, wherein the second access type is non-3GPP access and the second part of the network feature capabilities include EMCW.

17. The UE for handling network feature capabilities of claim 15, wherein if the first access network with the first access type and the second access network with the second access type are registered on the same PLMN, for a third part of the network feature capabilities, the processor determines whether a first registration procedure over the first access network occurred earlier than a second registration procedure over the second access network, wherein the first registration procedure corresponds to the first setting values for the network feature capabilities and the second registration procedure corresponds to second setting values for the network feature capabilities, and wherein if the first registration procedure over the first access network occurred earlier than the second registration procedure over the second access network, the processor adopts the second setting values of the network feature capabilities corresponding to the second registration procedure over the second access network.

18. The UE for handling network feature capabilities of claim 17, wherein the first access type is 3GPP access and the second access type is non-3GPP access or the first access type is non-3GPP access and the second access type is 3GPP access, and the third part of the network feature capabilities includes IMS-VoPS-N3GPP, IWKN26 and MPSI.

19. The UE for handling network feature capabilities of claim 15, further comprising:
an RF signal processing device, coupled to the processor, obtaining a first information element from a service network when the UE registers to the service network over the first access network, wherein the first information element comprises the first setting values for the network feature capabilities, and obtaining a second information element from the network when the UE registers to the service network over the second access network, wherein the second information element comprises the second setting values for the network feature capabilities.

20. The UE for handling network feature capabilities of claim 19, wherein if the first access network with the first access type and the second access network with the second access type do not register on the same PLMN, the processor adopts the first setting values for the network feature capabilities when the UE registers to the service network over the first access network, and adopts the second setting values for the network feature capabilities when the UE registers to the service network over the second access network.

* * * * *